UNITED STATES PATENT OFFICE.

LEO H. BAEKELAND, OF YONKERS, NEW YORK.

PACKING MATERIAL.

941,605.   Specification of Letters Patent.   Patented Nov. 30, 1909.

No Drawing.   Application filed February 1, 1909. Serial No. 475,522.

*To all whom it may concern:*

Be it known that I, LEO H. BAEKELAND, a citizen of the United States, residing at Yonkers, in the county of Westchester and State of New York, have invented certain new and useful Improvements in Packing Material, of which the following is a specification.

This invention relates to packing materials, and comprises a packing material, packing, gasket, washer or the like containing as an essential component an insoluble and infusible condensation product of phenol and formaldehyde of the character described in my copending applications, Serial Nos. 383,684, filed July 13, 1907, 397,560, filed October 15, 1907, and 405,021, filed December 4, 1907, or a partial reaction product of phenol and formaldehyde capable of transformation by heat into the said insoluble and infusible product. This material is highly resistant to heat and chemical action and I have found gaskets or similar forms of packing material containing the same to be capable of withstanding hot steam, hot gases, solvents and chemical solutions, which attack all other forms of packing material known to me.

The packing preferably comprises a fibrous or filamentary material of inorganic or organic origin, as for example asbestos, asbestos paper or felt, woven asbestos, ordinary paper, woven tissues or cloth, woven metal wire or similar substances, serving as a body or skeleton to be impregnated with the insoluble and infusible condensation product above referred to. I may also incorporate with the mass graphite, talc, soapstone or like materials, serving to harden it and to prevent sticking; or the packing may have an external coating of such materials, alone or in conjunction with the said condensation product.

Various methods may be employed in preparing the packing material. For example I may impregnate the fibrous or filamentary body with a mixture of approximately equal volumes of commercial phenol or other phenolic body and a commercial 40% solution of formaldehyde, or the polymers of formaldehyde, catalytic or condensing agents, preferably bases, being added if desired. The composition is then heated to effect the chemical transformation of the mass into the insoluble and infusible condensation product referred to. During this heating, or in the earlier stages thereof, the composition is preferably kept under sufficient pressure to prevent the formation of a porous product, as fully described in my copending applications above mentioned.

As fully explained in the said copending applications, there exists certain partial reaction products of phenol and formaldehyde which may be either liquid or solid, and which present a wide variation with respect to solubility, these partial reaction products having however in common the property of being transformed under the influence of heat into the insoluble and infusible condensation product to which I have referred above. These partial reaction products, whether liquid or solid, may be combined or mixed with the fibrous or filamentary body and thereafter transformed into the final condensation product by subjecting them to heat under suitable conditions. Whether the body be impregnated or mixed with the original phenol and formaldehyde or with a partial reaction product thereof, the reaction which effects the transformation into the final condensation product may be deferred until the packing is put into use, the heat to which it is subjected under conditions of use being availed of for effecting this transformation.

Another simple method of applying the invention is to coat or impregnate asbestos felt, paper or woven cloth with an alcoholic solution of a soluble partial reaction product of phenol and formaldehyde, and to permit the solvent to evaporate. The resulting composition may be kept ready for use either in sheets or in cut sizes, and may undergo the final transformation in use in case the conditions of use are suitable for effecting such transformation, that is to say in case the conditions are such that the material will be subjected to the joint action of heat and pressure.

The packing may be in the form of flat sheets or shapes as above described, or in the form of ropes, yarns, coils or braids of suitable shape or section, rendering it available for use in stuffing boxes, pistons, etc. Or the composition may take the form of loose fiber, properly mixed or impregnated with a partial or final reaction product. To any of these forms graphite, talc, soapstone or like material or lubricant adapted to prevent sticking may be added. I may also incorporate with any of the above described forms of packing material sheets, woven fabrics, wires or braids of metal, or powdered or granular metals.

The word "phenol" as employed in the claims is intended to include such phenolic bodies as are the equivalents of phenol for the purposes of this invention; and the word "formaldehyde" is intended to include the polymers of formaldehyde.

I claim:

1. A packing material containing an insoluble and infusible condensation product of phenol and formaldehyde.

2. A packing material comprising a body coated or impregnated with phenol and formaldehyde or a reaction product thereof.

3. A packing material comprising a fibrous body coated or impregnated with an insoluble and infusible condensation product of phenol and formaldehyde.

4. A packing material comprising a body coated or impregnated with phenol and formaldehyde or a reaction product thereof, and a lubricant.

In testimony whereof, I affix my signature in presence of two witnesses.

LEO H. BAEKELAND.

Witnesses:
H. S. TARBELL,
MARY L. SHORT.